United States Patent
Bourenkov et al.

(10) Patent No.: US 9,251,650 B2
(45) Date of Patent: Feb. 2, 2016

(54) METHOD AND SYSTEM FOR OPERATING INSTANCES OF A GAME

(71) Applicant: RATIONAL INTELLECTUAL HOLDINGS LIMITED, Onchan (IM)

(72) Inventors: Serguei Bourenkov, Toronto (CA); Vadim Sheikhman, Woodbridge (CA); Dmitri Ligoum, Aurora (CA)

(73) Assignee: RATIONAL INTELLECTUAL HOLDINGS LIMITED, Onchan (IM)

( * ) Notice: Subject to any disclaimer, the term of this patent is extended or adjusted under 35 U.S.C. 154(b) by 0 days.

(21) Appl. No.: 14/378,055

(22) PCT Filed: Feb. 10, 2013

(86) PCT No.: PCT/IL2013/000013
§ 371 (c)(1),
(2) Date: Aug. 11, 2014

(87) PCT Pub. No.: WO2013/118110
PCT Pub. Date: Aug. 15, 2013

(65) Prior Publication Data
US 2015/0024849 A1    Jan. 22, 2015

(30) Foreign Application Priority Data
Feb. 10, 2012    (GB) .................................. 1202370.1

(51) Int. Cl.
*A63F 9/24*    (2006.01)
*G07F 17/32*    (2006.01)
*H04L 29/08*    (2006.01)
*H04L 29/06*    (2006.01)

(52) U.S. Cl.
CPC .......... *G07F 17/323* (2013.01); *G07F 17/3225* (2013.01); *G07F 17/3237* (2013.01); *G07F 17/3293* (2013.01); *H04L 67/141* (2013.01); *H04L 67/42* (2013.01)

(58) Field of Classification Search
CPC ....................................................... G07F 17/32
See application file for complete search history.

(56) References Cited

U.S. PATENT DOCUMENTS

2006/0063593 A2    3/2006  Moshal
2009/0121438 A1    5/2009  Gustafsson
2010/0216534 A1    8/2010  Peck et al.
2011/0177863 A1    7/2011  Davidson et al.

FOREIGN PATENT DOCUMENTS

EP    2360631 A1    8/2011

OTHER PUBLICATIONS

International Search Report and Written Opinion issued in PCT/IL2013/000013, mailed on Jun. 17, 2013, 15 pages.
International Search Report and Written Opinion issued in PCT/GB2013/050297, mailed on May 7, 2013, 8 pages.

*Primary Examiner* — Omkar Deodhar
(74) *Attorney, Agent, or Firm* — Kenyon & Kenyon LLP

(57) ABSTRACT

Disclosed is a computer-implemented method of (and system for) operating instances of a game having a plurality of game positions that can be occupied by players, such as a poker-type game. The method comprises assigning a player a plurality of weights relating to game positions, where each weight indicates a bias towards placement of the player at a game position. When a player has played in a first game at a given position, the weights are updated to indicate an altered bias towards placement at each position. The player is then assigned to a second game based on the updated weights.

31 Claims, 10 Drawing Sheets

METHOD AND SYSTEM FOR OPERATING INSTANCES OF A GAME

CROSS REFERENCE TO RELATED APPLICATION

This application is a national stage of PCT/IL2013/000013, filed Feb. 10, 2013, which claims benefit of GB 1202370.1, filed Feb. 10, 2012.

INTRODUCTION

The present invention relates to methods and systems for operating instances of a game. Particular embodiments relate to wagering games, for example Poker-type games.

Online game systems operate games for participation by players using client devices to connect to a system over a network (e.g. the Internet). Popular types of game include wagering games, such as Poker-type games. However, such games can involve a significant amount of idle time for a player. For example, after folding early in a Poker hand, a player may be idle for a considerable time until the hand ends. This can not only reduce the quality of the user experience, but also makes inefficient use of the system's resources, since the system is required to maintain connections to large numbers of players despite individual players being idle for much of the time.

The present invention seeks to alleviate some of these problems. Particular embodiments of the invention provide a system that provides players with a steady stream of games to participate in, by automatically allocating a player to a new game instance (e.g. a new virtual Poker "table") as soon as the player becomes inactive in a previous game instance, for example by withdrawing from the game (e.g. folding a hand in Poker). However, when continuously assigning players to new Poker tables in this manner, it is desirable to exercise control over the positioning of players at the tables, to avoid players being given unfair advantages or disadvantages (since player position is strategically significant in some games, e.g. in Poker variants such as Texas Hold 'Em). Providing a technique which achieves this in a manner that meets fairness requirements and player expectations, whilst being computationally efficient, presents significant technical challenges.

STATEMENTS OF INVENTION

Accordingly, in a first aspect of the invention, there is provided a computer-implemented method of operating instances of a game having a plurality of game positions that can be occupied by players, the method comprising: associating with a player a plurality of weights relating to respective game positions, each weight indicative of a respective bias towards placement of the player at the respective game position; in response to participation of a player in a first game instance at a given game position, updating each of the plurality of weights to indicate an altered bias towards placement at each respective position; and assigning the player to a second game instance based on one or more of the updated weights.

In this way, the method provides a statistically fair assignment of players to game positions over a plurality of hands. Furthermore, the player assignment is carried out in a computationally efficient manner.

In preferred embodiments, the game is a wagering game, e.g. a poker-type game. In such cases game instances may also be referred to as "tables", and game positions may also be referred to as "seats".

Weights typically comprise numerical information, typically one (or more) numerical measure(s). Preferably, a weight is in the form of a number indicating a level of bias towards (or against) placement of a player at a respective game position. In preferred examples described herein, a lower weight value indicates a greater (stronger) bias towards a game position (and thus the bias is increased by reducing the weight value, and decreased by increasing the weight value). In preferred examples, a zero value may indicate a maximum (strongest) bias towards placement. However, it will be appreciated that, in other implementations, a different approach could be used, in which high weight values indicate a large bias and low weight values indicate a small bias. References to high/low weight values, and to reducing, increasing, adding to/subtracting from and other mathematical operations carried out on weight values, should be interpreted accordingly.

A weight value (or bias) is preferably indicative of a desirability, or probability, of placing a player at a particular game position. In addition, the weights for a player may indicate or encode information concerning past game positions occupied by the player (e.g. a player having recently occupied a particular game position may have a weight indicating a lower bias towards placement at that position in the future than a player having less recently occupied that game position).

Preferably, a weight is associated with each available game position. Game position weights are also referred to herein (in the context of Poker-type games) as "seat weights" (SW).

By using weight values to make player placement decisions, player allocation can be carried out efficiently whilst meeting desired placement criteria. Furthermore, by modifying a plurality of weights relating to a plurality of game positions after a player has participated in a game at a particular game position (rather than just, say, modifying the weight for the position just occupied), player assignment can be controlled more accurately, for example to provide for movement of the player along a particular desired position sequence.

The updating step is preferably performed in dependence on the given game position occupied by the player in the first game instance. In particular, different modifications are preferably applied to the weight for the just-occupied game position than the other game positions. In one example, a first modification is applied to the weight for the just-occupied position, and a second modification is applied to all other positions.

The updating step preferably comprises updating the weight for the given game position to indicate a reduced bias towards placement at that position. This reduces the chance that the player will be placed in the same position again.

The updating step preferably comprises updating the weights for one or more (preferably each) of the positions other than the given game position to indicate an increased bias towards placement at the one or more positions. This increases the chance that the player will occupy a different position in the second (or a subsequent) game instance.

Preferably, updating weights for positions other than the given game position maintains an ordering of those weights relative to each other. This can allow for movement of the player along a particular desired position sequence.

The weights are preferably updated so that, after updating, the weight for the given game position indicates a lowest bias towards placement at that position relative to the weights for the other positions.

Updating a weight may comprise multiplying the weight by an update factor. The update factor may be selected in dependence on a number of game positions in the game.

Updating a weight corresponding to the given game position may comprise one or both of: multiplying the weight by an update factor, and adding a predetermined weight value. In other words, for the just-occupied game position, updating the weight may comprise multiplying the weight by the same or a different update factor and/or adding (subtracting) a fixed term to (from) the weight. The fixed term may be selected in dependence on the number of game positions in the game.

Preferably, the method comprises initialising the weights prior to participation of the player in a game. For example, the weights might be initialised prior to participation of the player in a first game instance, after joining a game session. During the game session, the player is then preferably moved from game instance to game instance with weights being updated after each game instance in the manner set out above, until the player terminates participation in the game session.

Initialising may comprise setting the weight for a selected starting position to a given value indicating a first bias towards placement of the player at the starting position, and setting the weights for other positions to one or more other values indicating a lower bias towards placement at those positions relative to the first bias. In this way, it is made more likely that the placement algorithm will place the player at the starting position. For the same reason, the starting position weight may be set to a value indicating maximum bias towards the position (e.g. a minimum or maximum available weight value, such as zero).

Setting the weight for the selected starting position may comprise calculating the average weight for that starting position, where $$AvgWeight = \frac{1}{N\left(1 - \left(\left(\frac{N-1}{N}\right)^{TableSize}\right)\right)}$$

where N is a configurable parameter and TableSize is the number of players at a full table. Typically N is equal to three times TableSize.

Setting the weight for subsequent game positions, following play order comprises setting the weight as follows: $SW_{j+1} = (N-1)SW_j/N$.

Initialising preferably comprises setting the weights to respective values indicating a bias ordering of the game positions matching a predetermined game position order. The bias ordering may indicate a greatest bias towards placement at a first (starting) position as set out above. For example, in a poker-type game, the bias ordering may indicate a bias towards placement at a blind seat, in particular the Big Blind, with the bias reducing from there around the seat positions in normal poker seating/play order.

The assigning step preferably comprises: for a given game position in the second game instance, selecting the player from a plurality of players based on comparing the player weight for the given game position to weights for the given position associated with one or more other players. For example, the player with the greatest bias towards the position may be selected.

The assigning step may comprise assigning the player further based on a time value associated with the player.

Preferably, the assigning step comprises: for a given game position in the second game instance, computing a bias measure indicating a bias towards placement of the player at the given game position in dependence on the player weight for the given game position and a time value associated with the player.

The bias measure is preferably computed by modifying the position weight based on the time value. The bias measure is also referred to herein as an "effective weight", or "effective seat weight (ESW)". The bias measure is preferably computed such that an increase in the time value results in an increased bias towards placement of the player.

The time value preferably indicates a player idle time or wait time, preferably a time since the player ceased participating in the first game instance, or another indication of a time the player has been idle or waiting to be assigned to a game instance. In this way, the likelihood of a player being placed in a particular game position of a game instance increases the longer that player has been idle/waiting. This can reduce idle time for players. The time value may be weighted by a weighting factor, which may be fixed or variable, for example variable based on a number of participating players. The weighting factor may be selected (e.g. empirically) to achieve a reasonable compromise between player wait times and placement accuracy.

Preferably, the method comprises, for a given game position in the second game instance, computing a bias measure relating to the given game position for each of a plurality of players (preferably in the manner set out above); selecting the player having a bias value indicating the greatest bias towards placement at the given game position; and assigning the selected player to the second game instance at the given game position.

The method may comprise assigning the player to the second game instance in response to a player action in the first game instance. The player action may comprise withdrawal from the game (or a game round or hand), e.g. by folding in a Poker-type game (folding may occur out-of-turn as described elsewhere herein, with the player assigned to, and able to participate in, the second game instance before the fold action has been implemented in the first game instance in the proper turn order). The method may comprise connecting the player to the second game instance while maintaining the player's connection to the first game instance.

The assigning step is preferably performed in accordance with a placement algorithm.

The placement algorithm may be selected, and/or one or more parameters of the placement algorithm may be varied, in dependence on a criterion, such as a number of participating players.

The placement algorithm is preferably initiated in response to a triggering condition, the triggering condition preferably comprising one or both of: expiry of a time limit; and a number of idle players exceeding a threshold. For example, the placement algorithm may be triggered in response to either of the above conditions occurring. The time limit may be a given time period since the placement algorithm last ran.

In a further aspect of the invention, there is provided a computer-implemented method of operating instances of a game having a plurality of game positions that can be occupied by players, the method comprising: initiating a game instance; for each game position in the game instance, assigning a player to the game position, wherein the assigning comprises, for a given game position: for each of a plurality of players available for assignment to the given game position, calculating a bias measure indicating a bias towards placement of the player in the respective position, wherein the bias measure is calculated in dependence on (i) position weighting information associated with the player, and (ii) wait time information indicating a time the player has been waiting to be assigned to a game; selecting one of the plurality of available players in dependence on the calculated bias measures; and assigning the selected player to the given game position.

The selecting step preferably comprises selecting the player having a bias measure indicating the greatest bias towards placement at the given game position, e.g. the selecting step may comprise selecting the player having the lowest or highest bias measure. In this and any other aspect, the placement algorithm may commence player placement at a predetermined starting game position (e.g. big blind) or may alternatively commence placement at a randomly selected starting position. Subsequent positions may be placed in normal play order, some other preselected order, or again in random order. The method in this aspect may incorporate any of the steps of any other method aspect set out herein.

In a further aspect of the invention, there is provided a computer-implemented method of operating instances of a game having a plurality of game positions that can be occupied by players, the method comprising: for each of a plurality of players, associating with the player: a plurality of weights relating to a plurality of respective game positions, each weight indicative of a respective bias towards placement of the player at the respective game position; and an idle indicator for indicating whether the player is currently participating in a game or is idle; initiating an instance of the game; for each game position associated with the game instance, selecting one of the plurality of players in dependence on the players' idle indicators and weights for the game position, and assigning the selected player to the game position; and updating each of the plurality of weights associated with an assigned player to indicate an altered bias towards placement of the assigned player at each respective position.

The method may further comprise, in response to cessation of a given player's participation in the game instance, setting the idle indicator for the player to indicate that the player is idle.

The selecting step preferably selects only idle players according to their idle indicators. The method may further comprise associating an idle time with players indicated as being idle by the idle indicator, and wherein the selecting step selects a player for a game position further in dependence on the players' idle times. The method in this aspect may incorporate any of the steps of any other method aspect set out herein.

In a further aspect of the invention, there is provided a computer-implemented method of operating instances of a game having a plurality of game positions that can be occupied by players, the method comprising: associating with each of a plurality of players a plurality of counters relating to respective game positions, wherein a player's counter corresponding to a given game position is updated (preferably incremented) in response to the player participating in a game at the given game position; assigning players from the plurality of players to a game instance based on the counters, wherein the assigning step comprises, for a given game position in the game instance: determining position weights for each of a set of players, wherein determining the position weight for a player comprises calculating the position weight based on the player's counter for the given game position and a number of games participated in by the player (for example since joining a game session or since some other defined point); selecting one of the set of players based on the position weights; and assigning the selected player to the given game position in the game instance. This procedure is preferably performed for each game position.

Determining the position weight for a player preferably comprises: determining a ratio of the number of games participated in by the player (e.g. since joining a session or some other defined point) and the number of game positions available in the game (e.g. the table size in Poker), and modifying the player's counter value based on the ratio. In this context the number of games participated in by a player may refer to a number of rounds or hands in a game such as a Poker-type game. The method may comprise subtracting the ratio from the player's counter value.

The set of players may comprise all players of the plurality of players, or all available or idle players of the plurality of players.

The method may comprise selecting the set of players from the plurality of players. Selecting the set of players may comprise selecting players who are currently idle and/or selecting the players based on idle indicators associated with each of the plurality of players (as set out elsewhere herein). Selecting the set of players preferably comprises selecting randomly from available players. Preferably, a number of players are selected for the set corresponding to the number of available game positions in the game instance. For example, a number of players sufficient to fill all available game positions may be selected (e.g. randomly) from all available (e.g. idle) players, and then players are assigned to game positions from the set. This approach, and the above features relating to selecting a set of players for assignment to a game instance, may also be used in the contexts of the other method aspects set out above and below, and may be provided as an independent aspect of the invention.

Preferably, the position weight is determined further in dependence on a time value indicating a time the player has been idle, preferably in the manner set out elsewhere herein.

In any of the above aspects, assigning players may further comprise applying one or more player placement rules, a player placement rule indicating a preference for or against placing a player at a particular position (e.g. button or blinds) based on positions played by the player in previous game instances.

The method in this aspect may incorporate any of the steps of any other method aspect set out herein.

In a further aspect of the invention, there is provided a computer-implemented method of operating instances of a game having a plurality of game positions that can be occupied by players, the method comprising: associating with each of a plurality of players a position value relating to game positions played by the player in past game instances; in response to a player participating in a first game instance at a given game position, updating the position value for the player based on the given game position, wherein the position value is updated so as to accumulate the difference between position played in each game instance and a predetermined game position value, preferably an average game position value or middle position (e.g. table middle position in a Poker-type game); and assigning the player to a second game instance based on the position value. The method in this aspect may incorporate any of the steps of any other method aspect set out herein.

In a further aspect of the invention, there is provided a computer-implemented method of operating instances of a game, the method comprising: connecting a client application associated with a player to a first game instance operated by a server; in response to cessation of participation of the player in the first game instance, assigning the player to a second game instance; connecting the client application to the second game instance; and maintaining the connection of the client application to the first game instance during participation of the player in the second game instance. The method may comprise receiving an indication at the client application that the game in the first game instance has finished; and in response to the indication, terminating the client application's connection to the first game instance. The assigning is preferably performed in response to a user interaction indicating a desire to withdraw from the game (e.g. fold or fold out-of-turn). The method in this aspect may incorporate any of the steps of any other method aspect set out herein.

In a further aspect, there is provided a computer-readable medium comprising software code adapted, when executed on a data processing apparatus, to perform a method of operating instances of a game having a plurality of game positions that can be occupied by players, the software code comprising code for: associating with a player a plurality of weights relating to a plurality of respective game positions, each weight indicative of a respective bias towards placement of the player at the respective game position; in response to participation of a player in a first game instance at a given game position, updating each of the plurality of weights to indicate an altered bias towards placement at each respective position; and assigning the player to a second game instance based on one or more of the updated weights.

In a further aspect, there is provided a system for operating instances of a game having a plurality of game positions that can be occupied by players, the system comprising: means for associating with a player a plurality of weights relating to a plurality of respective game positions, each weight indicative of a respective bias towards placement of the player at the respective game position; means for, in response to participation of a player in a first game instance at a given game position, updating each of the plurality of weights to indicate an altered bias towards placement at each respective position; and means for assigning the player to a second game instance based on one or more of the updated weights.

The invention further provides a computer-readable medium comprising software code adapted, when executed on a data processing apparatus, to perform any method as set out herein; a system comprising means for performing any method as set out herein; and a game server, server device or client device comprising a processor and associated memory configured to perform (or participate in) any method as set out herein.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Furthermore, features implemented in hardware may generally be implemented in software, and vice versa. Any reference to software and hardware features herein should be construed accordingly.

The invention extends to methods and/or apparatus substantially as herein described with reference to the accompanying drawings.

DETAILED DESCRIPTION

These and other aspects of the present invention will become apparent from the following exemplary embodiments that are described with reference to the following figures in which.

OVERVIEW

The arrangements described here are intended to provide players with a constant stream of games, in particular poker games in an online environment by way of a new game type referred to herein as a "rapid placement game".

Figure 1:
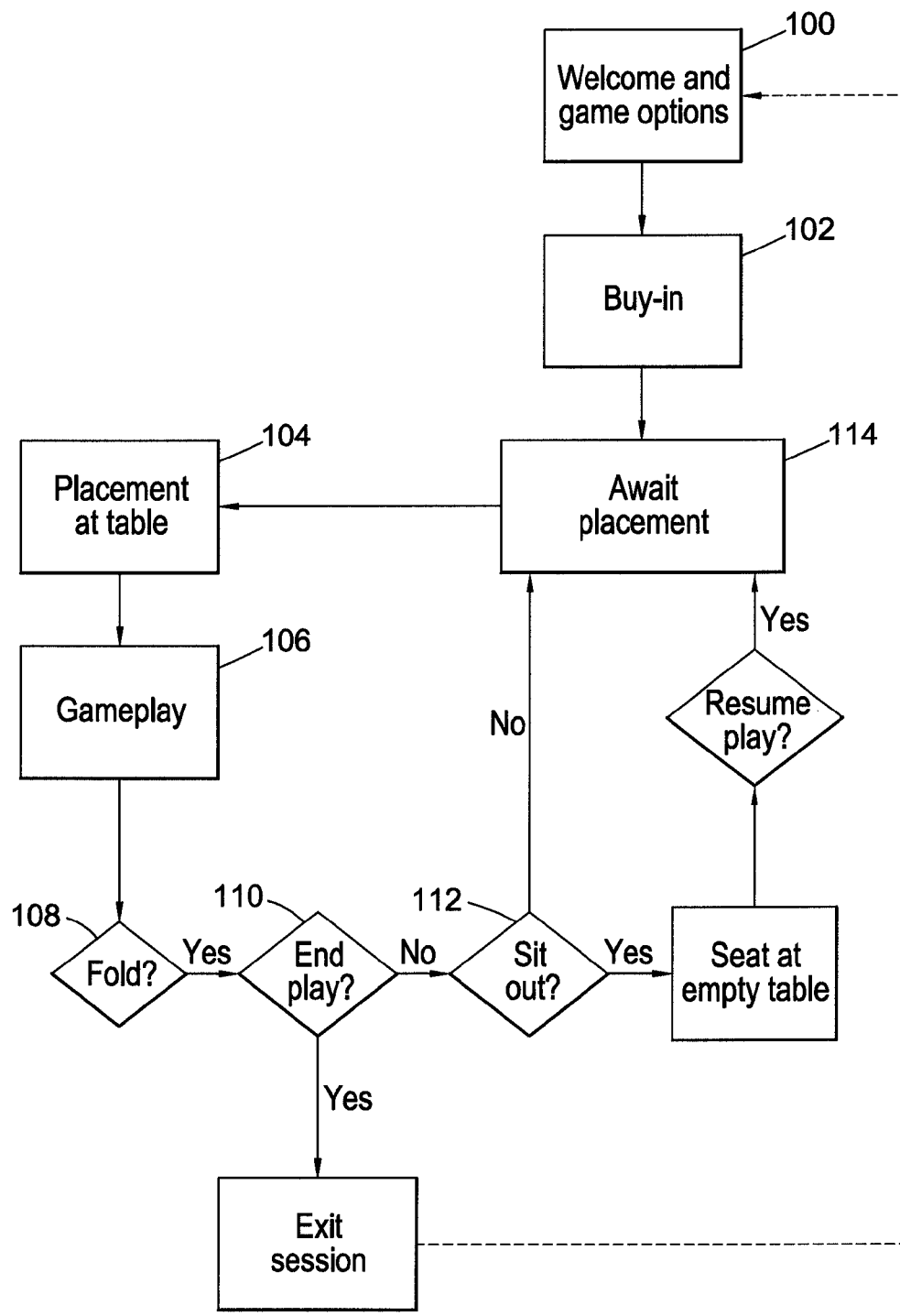
FIG. 1 shows a flow chart of a method for reducing player idle time in an online game system.

FIG. 1 shows a process diagram of how the rapid placement game is operated. A player enters (100) and selects this type of play, then completes the necessary registration or buy-in (102). The player then awaits placement (114). The player is placed at a table (104) and play commences (106). As soon as the player selects to fold (108), in or out of turn (and provided the player has not selected to end play (110) and has also not selected to sit out (112)), the system starts looking for a new game for that player while the player awaits placement (114).

In some games the player's options, and the information available to a player, depend on the player's seat at (or position on) a table. Thus, in some variations of the Poker game, players' strategic position and/or odds of winning may depend on their seating position at the table. In particular for poker games with a blind structure, position can be important. For games where position does not affect game play, such as Draw or Stud, players may be moved from one table to a next table without regards to position. For games where position does affect game play, such as games with a blind structure, position on the table should be taken into account when players are moved from one table to a next table. To ensure fairness to the players, a placement algorithm is provided. In particular, the placement algorithm may be designed to encourage that distribution of allocated seating positions is statistically uniform.

In the described rapid placement poker game, players are moved from one to another table immediately after folding or the end of a hand. This reduces the duration that players have to wait until all opponents have taken their turns and the game is over. If, for example, a player plays around 65-70 hands per hour on a normal no-limits (NL) full ring table, then by moving the player immediately after folding or the end of a hand, a player can play around 200 hands per hour (depending on the size of the player pool and other variables).

Figure 2:
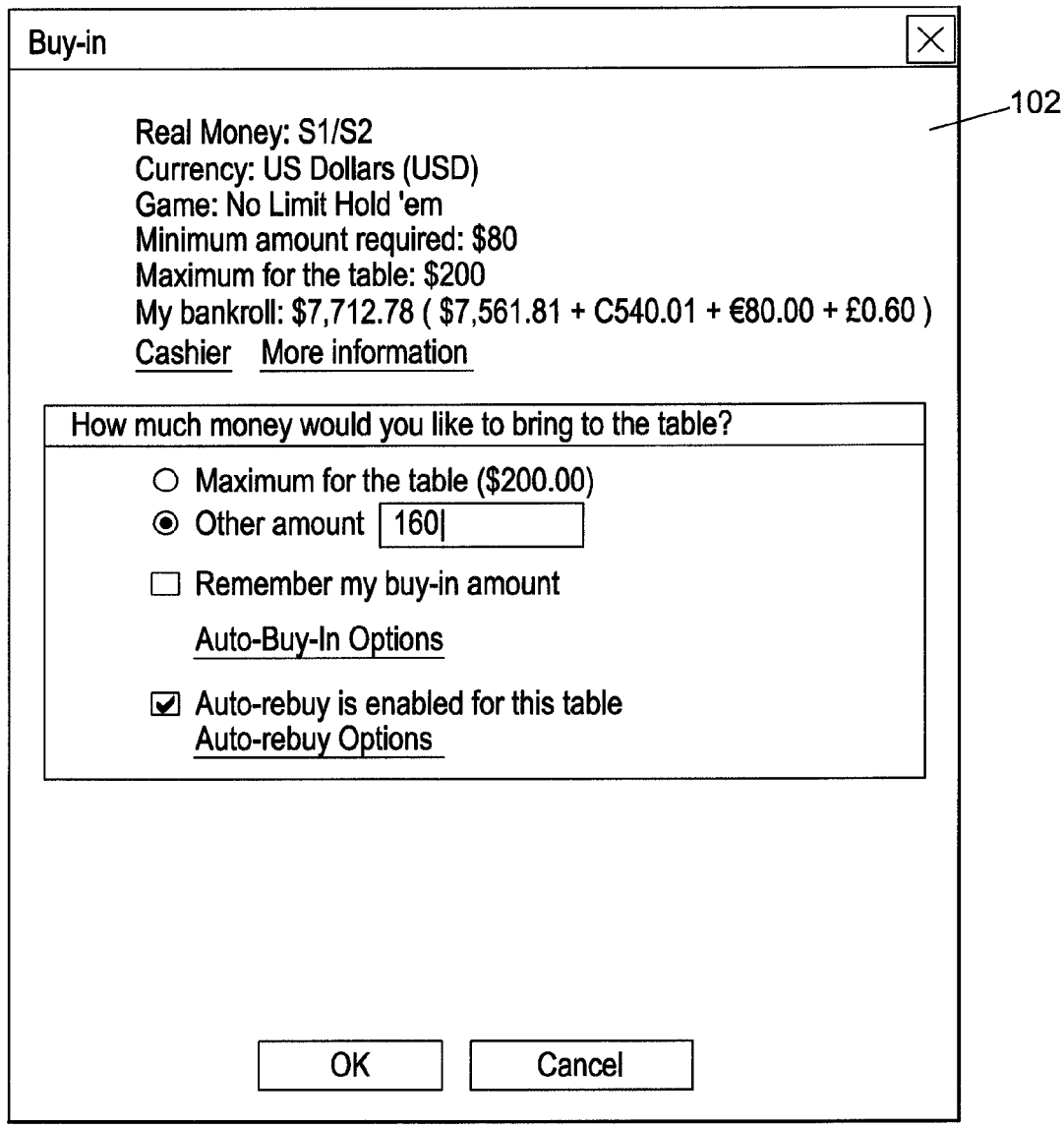
FIG. 2 shows an example of a buy-in screen.
Figure 3:
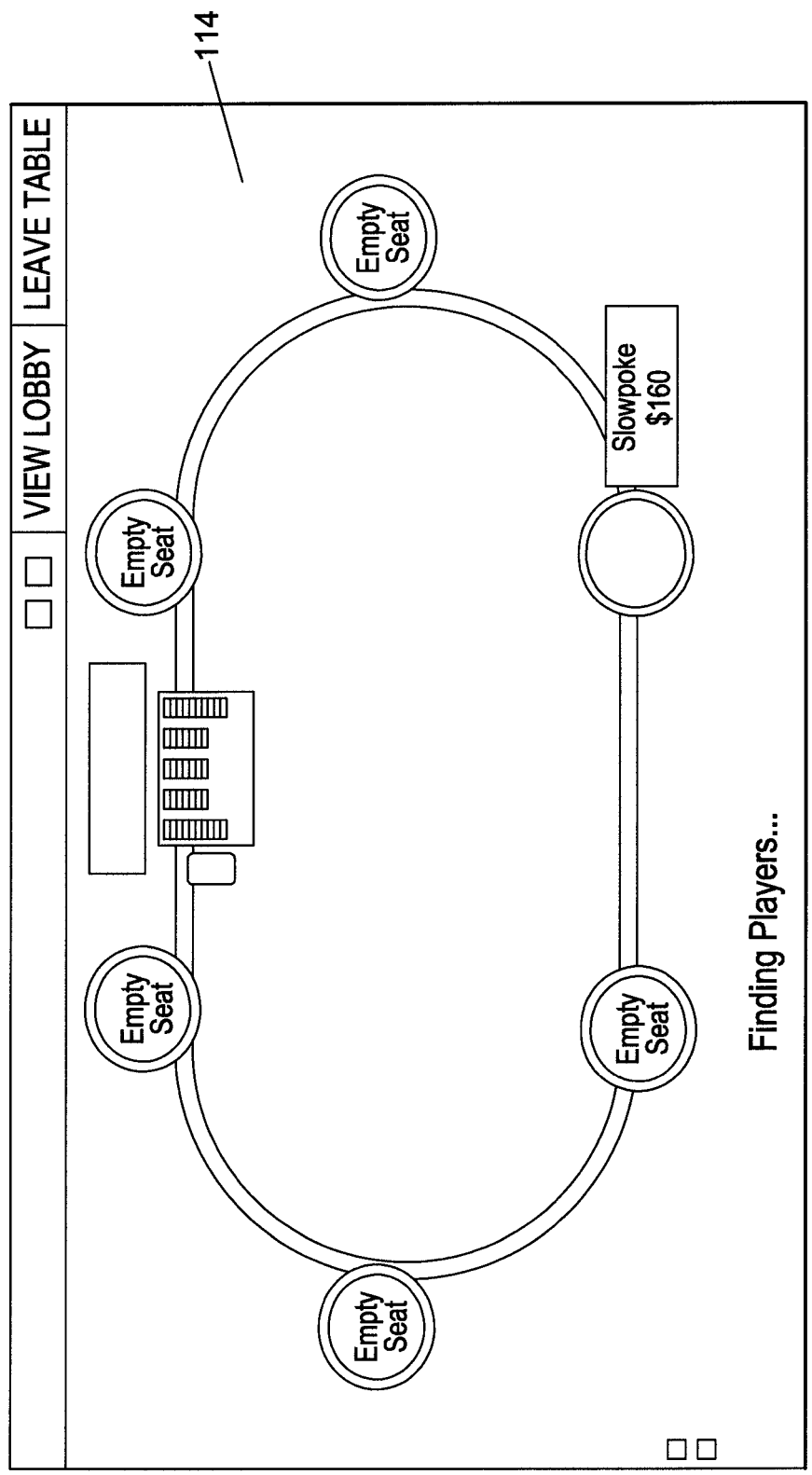
FIG. 3 shows a table where the player is seated and waiting for opponents.
Figure 4:
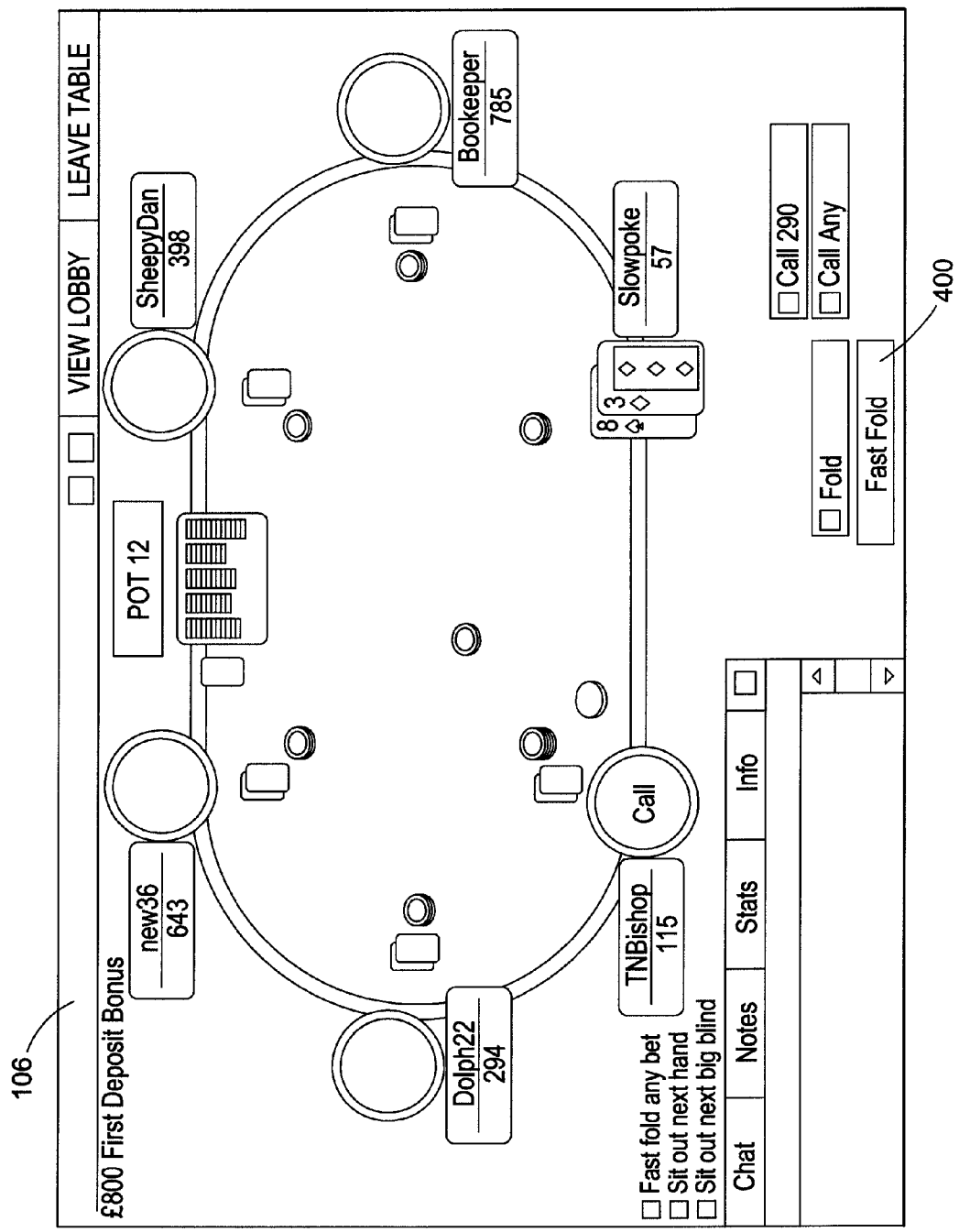
FIG. 4 shows an example of a game in progress.

In one implementation the sequence of actions is:
A player joining is immediately seated (or placed, or allocated to) at a table.
The hand begins once enough players have joined the table.
After players have ended action in their hand (by folding or ending in showdown), they are moved to a new table
If a table with players has an open seat: they are seated at that table
If there are no tables with open seats: a new table is spawned and the player is seated.
Some alternative approaches are also described below.
One advantage is an increase in the number of hands playable on a single table. The following are requirements that are considered:
Keep track of player position when possible (play like a normal ring game table).
Keep seat distribution as fair as possible across the orbits.
The following provides a quick walk-through from the player's perspective. More detailed description on each stage follows.
Main Lobby: the player selects participation, and completes any necessary registration or buy-in. (FIG. 2 shows a screen example of buy-in stage 102)
Seated at Table: the player is placed on a table. He is possibly the only player at that table. A graphic or a simple text may be displayed indicating or explaining that the system is looking for players and play will commence soon. (FIG. 3 shows a screen example of a table where the player is seated and waiting for placement at a table 114, or waiting for opponents)
Players Appear: opponents populate the table and play begins. (FIG. 4 shows a screen example of a game in progress 106) After the player folds, he is moved to a table (empty or part-empty) to await a new game and the process repeats.

The following table illustrates a simplistic example with a 6 player Hold'em table. For each game type dozens or hundreds of players play at the same time, so many new tables are constantly spawned.

TABLE 1

Example of a sequence of actions and corresponding results

| Action | Result |
|---|---|
| Phil begins playing | Table 1 is created and Phil is seated |
| Daniel, Tom, Chris, and Doyle start playing | Daniel, Tom, Chris, and Doyle are seated at table 1. There are only 5/6 seats taken, so no hand begins. |
| Richard starts playing | Richard is seated and the hand begins. |
| Joe, Mike, Lee, and Bubba start playing | Table 2 is created and Joe, Mike, Lee, and Bubba are seated. They are waiting for the next two players to start the end. |
| Tom folds at table 1 | Tom begins looking for a new table and is seated on table 2 |

TABLE 1-continued

Example of a sequence of actions and corresponding results

| Action | Result |
|---|---|
| Richard folds at table 1 | Richard begins looking for a new table and seated on table 2. Hand begins. |
| Richard, Mike, and Lee fold at table 2 | Table 3 is spawned and Richard, Mike, and Lee are seated |
| Table 1 goes to showdown so Phil, Daniel, Chris, Doyle begin looking for a new table | Phil, Daniel, and Chris are seated at Table 3 and play begins. Doyle is seated at Table 4 |

From Richard's perspective:
He starts playing and is seated at table 1. The hand begins.
He folds and is moved to table 2. The hand begins.
He folds and is moved to table 3.
Once Phil, Daniel, and Chris are added to table 3, the hand begins.
From the player's perspective, he is just getting moved to a new table every hand, without windows opening or closing.

Note that in the above example, players are placed at a new table immediately after folding at a previous table, and then wait for the table to fill up before play begins. In alternative implementations, the system only creates a new table once there are sufficient idle players to fill it, and then allocates players to the table according to a placement algorithm.

Thus, in this approach, all players of a new table are moved to their seats simultaneously. From the player's perspective, when he folds:
Player is now on a table by himself (as shown in FIG. 3)
All opponents are removed from the table
The chips, cards, etc. are all removed from the table
There are no new players
When a new table has been assembled (after whatever delay is necessary to assemble the new table):
All opponents are placed in seats around him.
The button is placed
Blinds are taken
Cards get dealt
Hand begins
Table Life Cycle
Tables are spawned when necessary, for example if there are no tables with open seats and a player is looking for a table; or if there are tables with open seats, but there is an instance of a player trying to join sitting at each of them. The life cycle of a table is as follows:
A table is created/becomes active—the table is now empty and accepts players
The table is filled with players
Table no longer accepts further players
Hand starts playing
Everyone leaves the table—Table is marked inactive. Table is either destroyed or recycled.
Sitting Out
A player can sit out for many reasons, including:
The player has selected a "Sit out Next Big Blind checkbox" and the next hand he was Big Blind.
The player has selected a "Sit out Next Hand" checkbox and his previous hand finished
The player has timed out during the hand and ended in the Time Out state
A player that is sitting out can remain at the current table, or be moved to a holding table by himself. The holding table requires another move. Keeping the player at the current table may cause confusion if multiple players sit out at the same time. If the player remains at the current table, but all other players are removed from the player's display (even if an opponent is sitting out at the same time), this issue is solved.

A player with 'sit out' status remains at the current table. This table has normal table functionality such as adding chips, changing theme, etc. A button is provided at this table called [I'm Back]. Clicking this button initiates placement of the player at a new table. A table where there are players sitting out is not permitted to be destroyed. If multiple players sit out on the same hand, they can either vanish from or remain visible on each other's table display once the current hand ends:

players vanish from each other's display: when a player clicks [I'm Back], from his perspective, he is moved to another table, and other new active players appear.

players remain visible on each other's display: when a player clicks [I'm Back], from his perspective, he is moved to another table, the other players sitting out disappear, and other new active players appear. From the other "sitting out" players' perspective, that player is removed from the table.

Sit out Next Big Blind

Players are provided the ability to optimize their blinds paid. Players have the option of selecting to sit out the next big blind, which then automatically inactivates the player if he is seated at big blind. In a placement process the next seating position may not be according to the customary sequence. If the player uses 'Sit Out Next Big Blind' functionality, his next seating may be biased toward seating at BB.

If the player has "Sit Out Next BB" selected, and the server would place him in the Big Blind the next hand, then the player is not placed and instead sits out. He is no longer looking for a table and must either close the window to leave or press the "I'm Back" button to resume playing.

If positional continuity is maintained across sessions adaptation may be necessary. For example:

Player quits a table in position 4

Player starts playing again the following day

Player's first hand would be in position 5 instead of the Big Blind

Not having "Sit Out Next Big Blind" would be frustrating to players who are used to "optimizing their blinds" and want to leave right before their Big Blind. This is how players want to end sessions, and how they currently end sessions at Casinos (manually) and on other ring game tables.

Timing Out

When a player times out, he is placed in a standard 'sitting out' state.

A player in this state folds if facing a bet

If a player ends the hand in the "sitting out" state, he stays at his current table.

There is an [I'm Back] button. Pressing this button makes the player active again and moves him to an active table where he plays his next hand.

Closing the Table

When a player closes the table (after possibly additional confirmation that he wishes to leave the session), the player disconnects from the table (the player will fold) and is set to 'not looking for a new table'. His session is over.

Quick Fold

Quick Fold (or Fast Fold) is available to all players, except when in the Big Blind, where there is only a quick fold button once someone raises. FIG. 4 shows a 'Fast Fold' button 400, which the player may select. Results of selecting Quick Fold are:

On player's screen: Player folds the hand and immediately looks for another table; he is moved to another table as soon as possible, without awaiting his turn.

On all other players' screens: There is no visual change to the player who pressed Quick Fold until it's his turn, then his hand is folded.

The player may be provided with advice regarding use of this option, for example with a message stating "Tip: Fold your hand and move to another table." The tables where the Quick Fold option is available may be specially indicated; games with this option may be entered via a special selection.

Hand History

It is possible that every player at the table played on a completely different table in the last hand. Further, the last hand played by a player may not be complete yet. This is taken into account when providing hand history information.

Game Lobby

Figure 5:
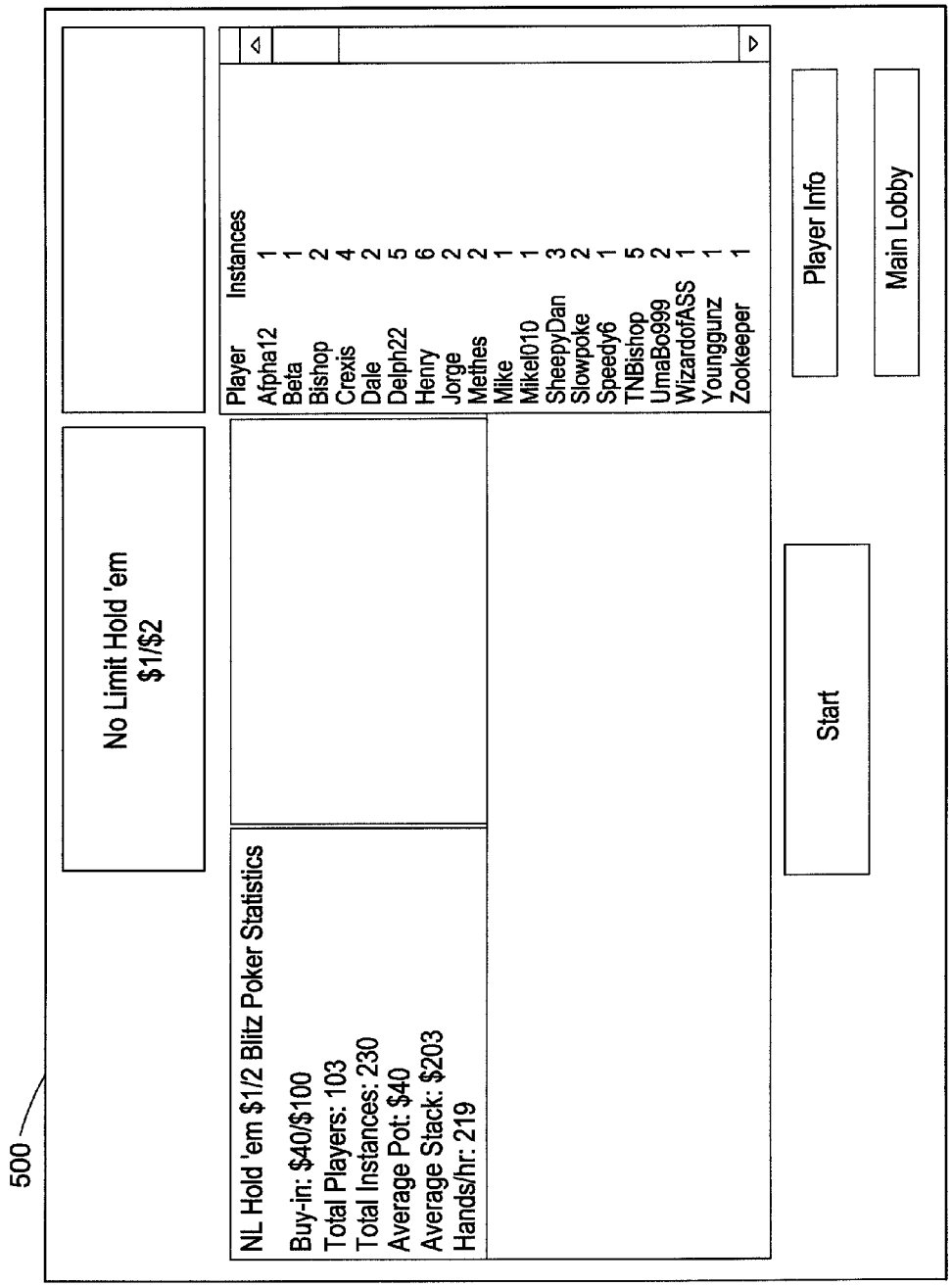
FIG. 5 shows information that is generated regarding a particular type of play.

FIG. 5 shows a screen example 500 of the type of information that is generated and provided regarding a particular type of play. This information can for example be displayed to the prospective participant. Instead of keeping track of individual tables, the statistics keep track of every table associated with the particular type of play (e.g. rapid placement game). The average pot size looks at all hands played, over all tables. As a player can be associated with more than one table at a time (for example with the Quick Fold functionality described above, or by joining the game more than once as described above), the number of instances of each player may be shown. The average hands per hour can be calculated by averaging over players, or over player instances.

Placing Players

The following sections describe various approaches to player placement. Features of these approaches may be combined in any appropriate manner.

The server periodically looks for players who are in the 'ready for next hand' or 'idle' state. If there are enough waiting players to fill a table, a new table is created and the players are moved. A player's priority is determined by a 'WaitingTime' parameter and his claim to a particular position. The players are seated optimally if possible. A new player is generally placed in the Big Blind first. If there are multiple new players ready to be placed, one can be placed in another position; otherwise starting of new games would be obstructed, and it would take unreasonably long for some players to start playing. A 'MaximumWaitTime' parameter can be defined, whereby if the player 'WaitingTime' parameter is equal or greater, the player is released for placement in any position. Before a player has waited this long, placement in his optimal position is encouraged.

Players can be placed at new tables individually (one by one), or all at once. Placing players individually offers faster response time at the cost of less optimal placement. A hybrid approach shows on the player's display that he is moved to a new table immediately, and once a full table is found, all players appear around him. The player is however not actually moved, or placed, until a full table is found.

New Player Position

When a new player enters a session, he is preferably assigned to a BB spot position for the first game. If there are numerous new players starting at the same time, position assignment might be hampered. There are several ways to address this:

Allow player to be assigned to BB on one of the subsequent rounds. New player's priority for BB seat is higher than any of the players already in the rotation, so it is very unlikely that his BB will be delayed by more than one turn Set a higher timeout for a new player and do not place them until BB spot is available Post BB for them and treat it like they have taken actual BB spot (so they are not assigned to it on the next round)

Player Positional Statistics & Optimal Position

Storing player position information allows the player positioning to attempt to place players in successive positions. Player placement in successive positions makes play like normal ring games, where the player generally moves from Under the Gun (UTG), to Big Blind (BB), to Small Blind (SB), to Button position (at least when there is high liquidity). The following in particular should be avoided or minimized:

The player is in BB position multiple times in a row

The player is in either blind three or more times in a row (e.g. BB, SB, BB)

The player is in SB position multiple times in a row

The player plays many hands (e.g. table size*2) without playing on the Button

The player has to wait for a long time despite large amounts of players

The player plays any non-blind position (such as UTG) multiple times in a COW

If the system is unable to place the player in the optimal position within a time period (for example 1000 milliseconds), the player can be placed in a sub-optimal position. This sacrifice of (short-term) accuracy of placement benefits the speed of placement.

To assist placement the following are tracked for each player:

Position in the last hand played

Position count over the last X hands

The following criteria influence the positional status for a player:

Times in each position over the last X hands. The more times in a certain position, the colder the seat becomes.

LastPosition—particular emphasis (e.g. by a multiplication factor) to the position played in the last hand. This reduces the chance a player is in the same position twice in a row, which is to be avoided.

NaturalPosition—The player's natural position (next position after last hand) gets a bonus. This helps play feel natural, that is like live ring games, as player moves from UTG, to BB, to SB, etc.

By ensuring the above criteria are drawn into the placement natural play flow (like in a normal ring game) is encouraged. Sub-optimal placement of a player is, over time, made up for, e.g. by increasing the priority of optimal placement for a following period; or by ensuring that, over time, a fair (uniform) placement distribution is achieved for the player.

For example: in the last hand a player was in the middle position (making UTG the natural next position). For a 'Natural Position' multiplier of 0.9, and a 'Last Position' multiplier of 1.1, the following placement weightings are calculated:

TABLE 2

Example of calculation of seat weight

| Position | Position name | Times previously played | Natural position bonus | Last position penalty | Weight |
|---|---|---|---|---|---|
| 1 | Button | 6 | | | 6 |
| 2 | Cut-off | 5 | | | 5 |
| 3 | Middle | 5 | | ×1.1 | 5.5 |
| 4 | UTG | 5 | ×0.9 | | 4.5 |
| 5 | BB | 5 | | | 5 |
| 6 | SB | 5 | | | 5 |

The placement weights for the next round give the following placement preference: at first preference, with the lowest weight, is the UTG position; at second preference is either of the Cut-off, BB, or SB positions; at third preference is the Middle position; at last preference is the Button position.

Placement Based on Position Weights

The following section describes in more detail a particular implementation of the placement algorithm, which employs some of the features outlined above.

Figure 6:
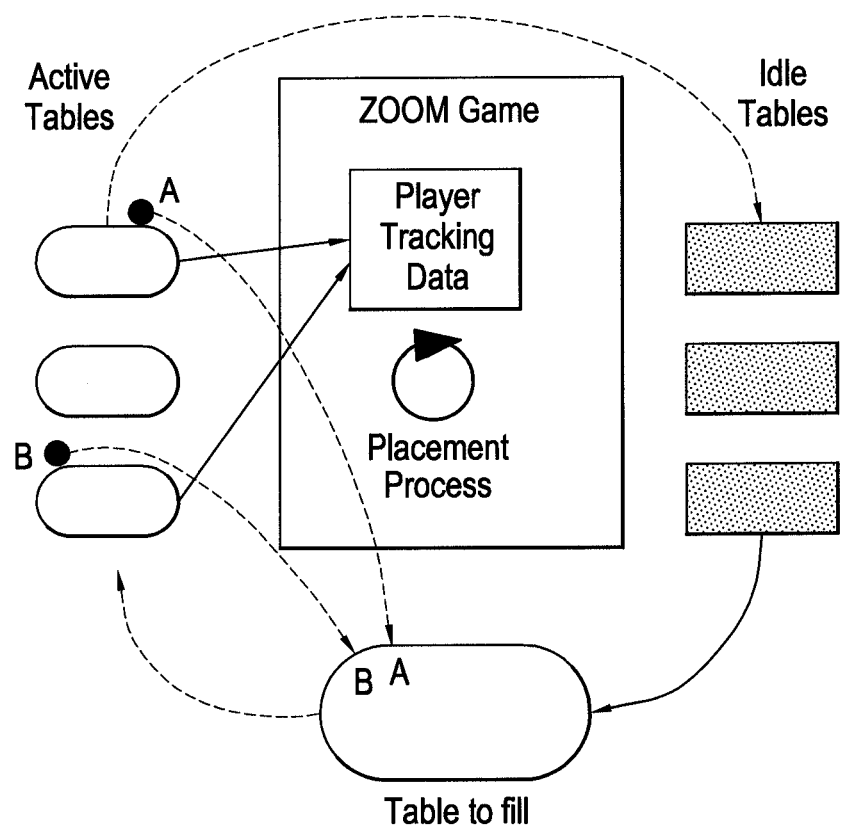
FIG. 6 illustrates a placement algorithm.

FIG. 6 illustrates the operation of the placement algorithm. In this case, Players A and B have selected to fold out of turn at their respective tables (with the quick fold option described above). The placement process is initiated and executed. The placement process assigns players A and B, in this example, to the same new table.

Once the placement of the new table has been completed, all players selected for the new table, including players A and B, connect to that table, after which the new hand starts. As players A and B have folded out of turn, they still maintain connections to their original tables, until the hands on those tables are completed. When those hands are over, players A and B are disconnected from their original tables and those tables are moved to the pool of idle tables.

The placement process can be triggered, for example, by a timer, where the placement process is arranged to periodically start (e.g. every 1000 milliseconds). Alternatively the placement process can be triggered based on a combination of factors, such as timer and the number of players whose status has changed to idle exceeding a threshold. For example, placement can be triggered when the number of idle players becomes equal to 4*TableSize or by exceeding a timeout of 1 second, whichever comes first.

Figure 7:
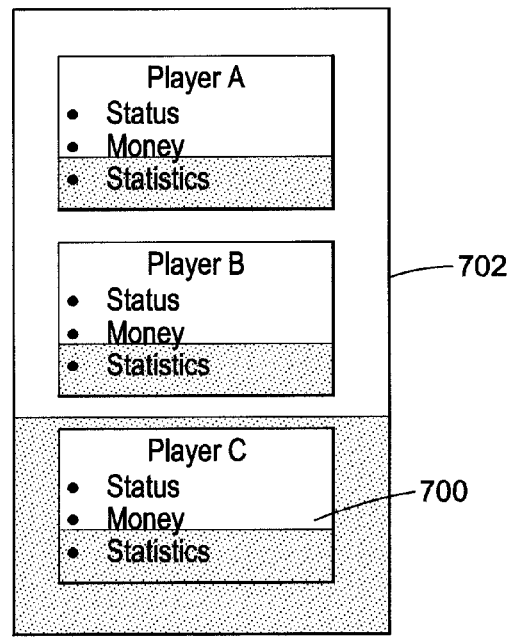
FIG. 7 shows a data structure for managing players.

FIG. 7 shows a data structure 702 for managing players in more detail. For each player the player record 700 holds all the data relevant to player's finance, game and connectivity status, as well as statistics specific to a type of game. The statistics may in particular relate to player placement in subsequent game rounds. This record is created as soon as the player connects (after buy-in) to a rapid placement game session and is removed after the player leaves the game session. In the process of game play the player's status is updated accordingly.

The status information is used to indicate if a player is awaiting placement at a new table, by way of an "idle" flag or the like. The placement process may operate to identify if a player is awaiting placement, and if so, attempt to place the player. Identification of player status can be done at the start of each placement cycle, by accessing the tracking data for each player and checking the status information.

In an alternative approach, the players may be assigned immediately to a new table when they become idle, with player placement being re-organised once the table is full based on placement requirements determined by the algorithm.

A number of different approaches to the player placement algorithm will now be described. Features of these approaches may be combined in any appropriate manner.

Player Placement: First Approach

The placement process follows the following flow:

1. The poker game is initiated by the operator and creates a number of identical game tables in idle state.
2. Players sign up for the game; their state is set to idle (indicating that they are awaiting placement)
3. For each player an array of seat weights (SW) is initialized as follows:
    a. $SW_i$=AvgWeight (statistical average of the seat weight over long period of play)

$AvgWeight=1/(N*(1-(POWER((N-1)/N, TableSize))))$ where N is a configurable parameter, typically N=3*TableSize b. For each subsequent seat following play order:

$$SW_{j+1} = (N-1)SW_j/N$$

c. $SW_2=0$ (setting the weight to zero for position 2 causes new players who join the rapid placement game session to start in a big blind position, as it is customary in poker)

The resulting (initial) distribution of seat weights aims to mimic the distribution that a player would achieve after playing many orbits at the table with the ideal seating position change order. This makes the placement characteristics of new players joining the game similar to those of players who have already been playing for a long time.

To take the example of a table with 6 seats, and using N=18, by applying points a) and b) from above, the distribution for an ideal game is calculated as shown in Table 3.

TABLE 3

| Ideal Seat Weight distribution after pos #3 | | | | | |
|---|---|---|---|---|---|
| 0 (button) | 1 (SB) | 2 (BB) | 3 | 4 | 5 |
| 0.1612 | 0.1522 | 0.1438 | 0.1914 | 0.1807 | 0.1707 |

The distribution in table 3 reflects the player having completed a full circuit after having started at BB. Further taking point c) from above into account, the initial distribution of seat weights for 6-seat table is illustrated in table 4. The only difference compared to ideal distribution in table 3 is that the seat weight for position #2 (Big Blind) is artificially lowered to 0. Any player who already played at least one BB position cannot have their seat weight equal to zero, so new players joining the game always have higher priority to occupy this seat than players already in the game.

TABLE 4

| Initial Distribution of Seat Weights | | | | | |
|---|---|---|---|---|---|
| 0 (button) | 1 (SB) | 2 (BB) | 3 | 4 | 5 |
| 0.1612 | 0.1522 | 0.0000 | 0.1914 | 0.1807 | 0.1707 |

4. The placement algorithm is initiated, as described above.
5. The algorithm selects the first idle table from the list and starts looking for the player to place in a big blind position (alternatively, the algorithm could start at a different position, for example a randomly selected position)
6. The algorithm goes through the players who are marked idle and selects the player with the minimal SW for that position. Alternatively, the Effective Seat Weight (ESW) can be used instead of the SW, whereby:

$$ESW_j = SW_j - Q \cdot \text{Wait Time},$$

where

Q is an empirically selected Wait Time Factor,

Wait Time is the time from the moment the player has been marked as idle, to the current round of placement The use of ESW instead of regular Seat Weights allows balancing the algorithm to avoid situations where players wait for a long time to be placed in an ideal position. With the addition of the Wait Time factor, the algorithm takes into account the time players have spent waiting for placement and places them more aggressively. The effects of the Wait Time factor and the optimal choice of a Wait Time factor value are described in more detail below.

7. Additionally, the algorithm checks for the following conditions
   a. Players cannot be assigned to a position they occupied in the previous round if that position requires them to post a blind
   b. Players who have been dealt 2 blinds in two previous rounds of the game cannot be assigned to either big or small blind position
8. The placement process is repeated for all remaining positions of the table: small blind, then the button, then remaining seats counterclockwise
9. Once the table has been filled, the Seat Weight array of each player (who just played at position "Position Number") is updated as follows (for each position n):
   a. If (n=Position Number AND $SW_n=0$) then $SW_n$=AvgWeight (as defined above in step 3)
   b. Else, If (n=Position Number) then $SW_n=((N-1)SW_n+1)/N$ (to increase the weight of the seat just occupied)
   c. Else $SW_n=(N-1)SW_n/N$ (to reduce the weight of all remaining seats)

Taking for example the distribution of seat weights after an ideal round, as presented in table 3, the player has just played in position #3, and, in an ideal game, is supposed to take Big Blind (BB) after that. After the player has played in BB, his Seat Weight for the BB position is updated according to the formula in step 9.b: New Weight=1/18+(18−1)/18*0.1438=0.1914. The Seat weight for position #3 is updated according to the formula in step 9.c: New Weight=(18−1)/18*0.1914=0.1807 and so on. As a result there is a cyclical shift to the left in the weight distribution, as shown in Table 5.

TABLE 5

| Ideal Seat Weight distribution after BB | | | | | |
|---|---|---|---|---|---|
| 0 (button) | 1 (SB) | 2 (BB) | 3 | 4 | 5 |
| 0.1522 | 0.1438 | 0.1914 | 0.1807 | 0.1707 | 0.1612 |

10. The game then starts at the table.

After the cards are dealt, players are given the option to fold out of turn, in addition to regular poker game options. Players who fold out of turn are marked as idle, but remain connected to the same table so that the game can continue as usual and their intention to fold is not revealed to other players at the table.

The players who have used the fold out of turn option can be placed at the next table before the game is completed at the original table. In this case they are connected to more than one table simultaneously, but are only active at one of the tables. This situation is illustrated in FIG. 8.

Figure 8:
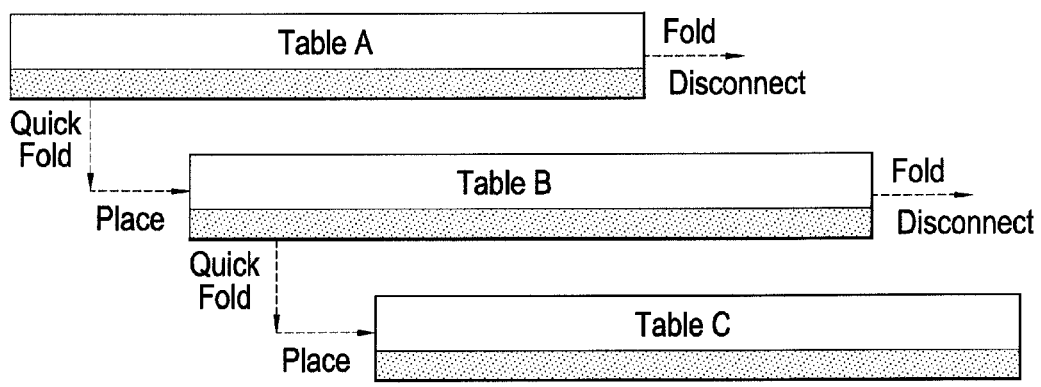
FIG. 8 shows players connected to more than one table simultaneously.

In FIG. 8, a player is initially placed at table A, in a position far from Big Blind. The cards are dealt and the player immediately selects the Quick Fold option. At that moment, the player is marked as idle. The placement algorithm places him at table B at the next placement event. At that moment the client is still connected to the original table and to the other players at table A appears to be waiting for his turn to move. At table B, the player also immediately selects Quick Fold, and is then placed at table C. At that time the client is connected to three tables simultaneously. Once the player's turn to act is reached at table A, the player's move (to fold) is displayed to other players and the player is disconnected from table A. Similarly, he is disconnected from table B once his turn on table B arrives and he has made his play (to fold).

Players who fold in the usual way, when it is their turn, using the regular fold option, are also marked as idle.

When a game round is completed, all players remaining at the table are marked as idle. As those players are placed to other tables, the table becomes empty, and is added to the list of idle tables. When the number of idle tables drops below a set threshold, a preset number of new idle tables is spawned. When the number of idle tables exceeds a set limit, a preset number of tables may similarly be deleted.

Special bonuses can be distributed at the end of a hand. They may be distributed to the relevant players instead of just to those remaining at hand end.

The players are allowed to join the same type of game more than once, each time providing separate buy-in. There may be a cap or limitation to the number of instances a player can have.

The placement algorithm checks for the identity of players already placed at the table being processed and does not allow the same player to be placed more than once to the same table.

Player Placement—Second Approach

As new tables are created every hand, player placement takes place at each hand. It may be advantageous to implement a simple positioning algorithm, for example if tracking all positions is too performance-intensive or harms the player experience. Another version of the placement algorithm uses a different way of determining Seat Weights that also provides fair and comfortable assignment of players to seats.

In this approach, the placement process follows the following sequence:
1. The rapid placement game is initiated by the operator, and a number of identical game tables in idle state are created.
2. Players sign up for the rapid placement game and their state is set to idle (indicating that they are awaiting placement).
3. Each player has an array of Seat Weights (SWj where j is in the range 0 . . . 8 for 9 seat tables) corresponding to table seats (0 . . . 8 for 9 seat table); Seat Weights are initialized as zeros for all seats.
4. Every time the player occupies a seat, the player's Seat Weight for that position is increased by one.
5. When Seat Weights are compared to determine the player most suitable to occupy the seat, the Effective Seat Weight (ESW) is used, whereby:

$ESW_j = SW_j - n\text{Rounds}/\text{TableSize}$ where nRounds is the number of hands played since the start of the session.

Alternatively, the wait time can be taken into account, whereby:

$ESW_L = SW_j - n\text{Rounds}/\text{TableSize} - Q*\text{Wait Time}$ where Q is an empirically selected Wait Time Factor, and Wait Time is the time from the moment the player has been marked as idle to the current round of placement. As discussed above, by taking into account the time a player has been idle, overall player wait times can be reduced.
6. The placement algorithm is initiated, as described above (e.g. activation based on a timer; activation based the number of players having idle status; or activation based on different events or combinations).
7. The algorithm selects the first idle table from the list and randomly selects the necessary number of idle players for this table.
8. The placement algorithm checks for the identity of players already placed at the table being processed and does not allow the same player to be placed more than once to the same table.
9. Starting with big blind position, the algorithm goes through the players who are selected for this table looking for the player with the minimal ESW for that position.
10. Additionally, the algorithm checks for the following conditions:
    a. New players are the first candidates for big blind. For example, new players who have just joined the session may have a special flag ('New') set. Players with this flag may be selected for BB position regardless of the weights of other players without a flag. If there are multiple players with the 'New' flag set, one of them may be randomly selected for the BB position. Once a player has been assigned to BB position for the first time, his 'New' flag may be cleared.
    b. Players who have been dealt 2 blinds in the two previous rounds of the game are the last candidates for either big or small blind position
    c. Players who have been assigned to big blind in the previous round are the last candidates for big blind.
11. The placement process repeats for all remaining positions of the table, small blind, then the button, then remaining seats counterclockwise.
12. The game then starts at the table.

The same provisions apply as described above with regard to: players folding out of turn; players using the regular fold option; players remaining at the table when a round of the game is completed; idle tables; and/or multiple instances of a player.

The Effective Seat Weight ESWj is preferably calculated using fractional values, not rounded or integer values. Alternatively scaled integer arithmetic may be used, for example: ESWj=SWj*TableSize−nRounds. ESW values are used for comparison, and the relative ESWj values can therefore be important. Calculations are therefore reasonably precise and rounding is preferably avoided or minimised.

In this placement approach, (nRounds/TableSize) is subtracted before comparing the numbers. Further, the placement starts from the big blind position. In an alternative approach (applicable to any of the described placement algorithms), placement may start at any other selected position or at a randomly selected position.

Player placement—Third approach

In a further approach, the placement process follows the following sequence:
1. The rapid placement game is initiated by the operator and a number of identical game tables in idle state are created.
2. Players sign up for the rapid placement game and their state is set to idle.
3. For each player a value of AvgPos is initialized with zero.
4. The placement algorithm is initiated, as described above (e.g. activation based on a timer; activation based the number of players having idle status; or activation based on different events or combinations).
5. The algorithm selects the first idle table from the list and randomly selects idle players to fill the table.
6. The placement algorithm checks for the identity of players already placed at the table being processed and does not allow the same player to be placed more than once to the same table, ensuring players at the table are unique.

7. Starting with the maximal table position the algorithm goes through the list of selected players and finds the player with the minimal AvgPos value. This player is assigned to that position. Additionally, the algorithms checks for the following conditions:
   a. Players who have been dealt 2 blinds in two previous rounds of the game are the last candidates for either big or small blind position.
   b. Players assigned to BB position in the previous round are the last candidates for BB.
8. The placement process is repeated for all table positions from maximal to minimal (for example from position 8 to position 0 for a 9-seat table).
9. Once the table has been filled, AvgPos of each player is updated as lows:

$$AvgPos=AvgPos+Pos-(MaxTablePlayers-1)/2$$

where Pos is the current table position (numbered from zero).

10. The game then starts at the table.

The same provisions apply as described above with regard to: players folding out of turn; players using the regular fold option; players remaining at the table when a round of the game is completed; idle tables; and/or multiple instances of a player.

In this placement approach the AvgPos value accumulates the difference between an actual position (Pos) and the table middle position (MaxTablePlayers−1)/2). For example on a 9-seat table a player assigned to a seat above 4 in a first hand is more likely to be assigned to a seat below 4 in the next hand. Statistically it provides a fair distribution relative to the blinds position. The AvgPos value is preferably calculated using fractional values, not rounded or integer values. Alternatively scaled integer arithmetic may be used. AvgPos values are used for comparison, and the relative AvgPos value can be important. Calculations are therefore reasonably precise and rounding is preferably avoided or minimised.

Other Approaches

Other approaches to player placement may be used. For example, in a further counter-based positioning algorithm:

Every player is initially seated at the table randomly

Rules determine which player gets assigned the Big Blind:
  Each player has a 'last time since Big Blind' counter.
  When the player was BB last hand: BigBlindCounter=0.
  When the player wasn't BB last hand: BigBlindCounter is incremented by 1
  When the new player starts a session BigBlindCounter=infinity (or any suitable high number).
  When the player returns from sitting out: BigBlindCounter=the value when player decided to sit out.
  If two players have the same BigBlindCounter: random assignment of one of the players to BB.

The rest of the positions follow the natural table order: small blind is to the right of big blind; the button is to the right of the small blind, etc.

The Effect of the Wait Time Factor on Quality of Placement

The following section describes considerations in the selection of the Wait Time Factor (Q) discussed in connection with some versions of the placement algorithm described above. Although principally discussed in relation to the first described placement approach, these considerations are equally applicable to other versions of the placement algorithm where such a Wait Time Factor or similar is used.

The quality of placement is generally determined by two parameters—the speed of placement and the fairness of seating position. The speed is important because the objective is to give players the ability to play as many hands per hour as possible. Seating position is very important in some variants of poker, for example Hold'Em. Players posting blinds are statistically at a disadvantage, while the player occupying dealer position (the button) has a statistical advantage. Therefore, for the game to be fair, the distribution of seats taken in the course of gameplay should be close to even over the game session. The placement algorithm is developed and fine-tuned against a number of parameters related to game quality. This is demonstrated by simulation, as shown in FIG. 9.

Figure 9:
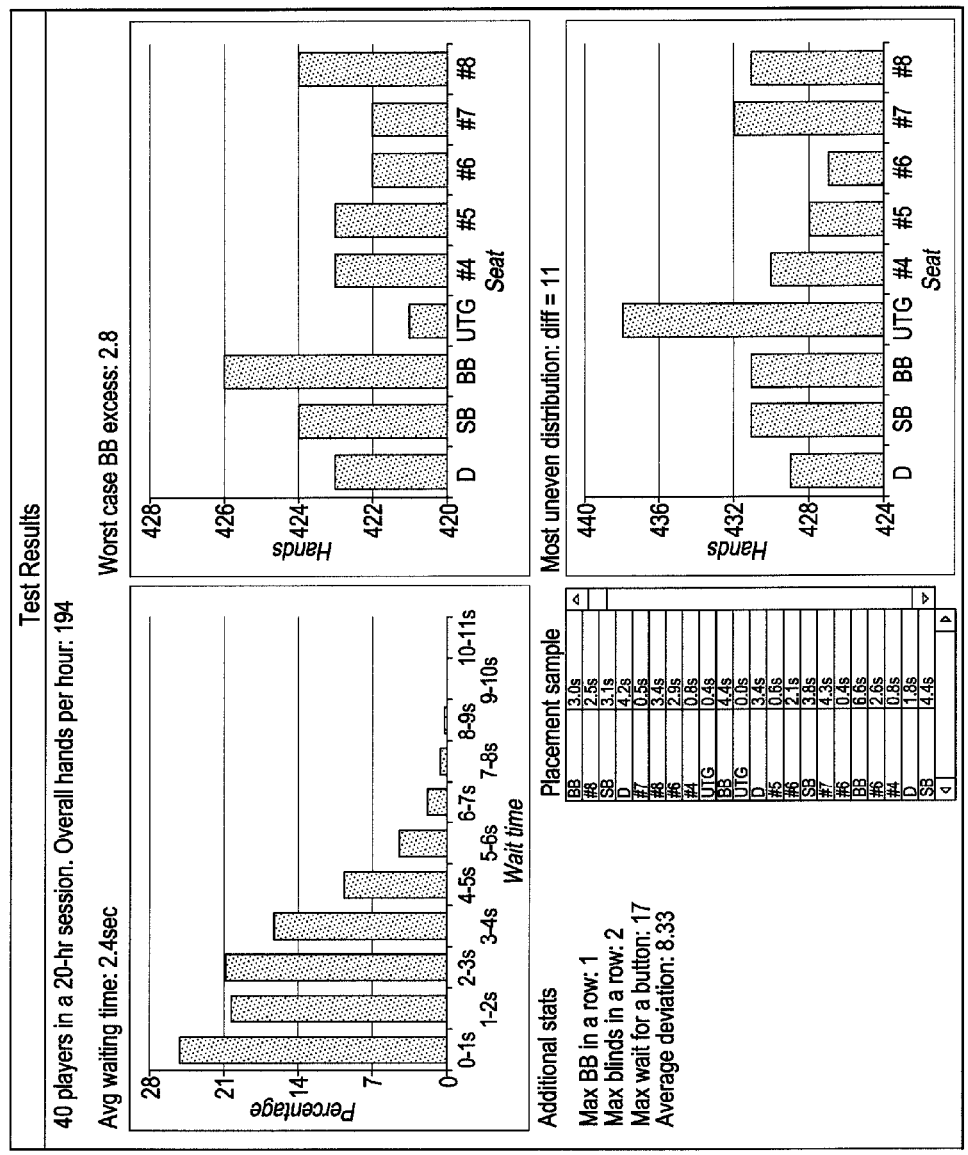
FIG. 9 shows analysis of placement process parameters.

FIG. 9 shows an example of simulation for 40 players playing at 9-seat tables. The number of players was kept low because any flaws of the algorithm are expected to be most noticeable in this situation. For real-world applications it is beneficial if the placement algorithm works well with a low number of players. Also, the liquidity of the game is spread between different game types/stake levels, so it could happen that less popular combinations do not attract hundreds of players.

The simulator calculates a number of metrics related to the quality of the placement algorithm:

Hands Per Hour:

The most important parameter showing overall success of the algorithm. Typical values start with 200 hands per hour with relatively small numbers of players (4-5 times the table size) and reach 230 hands per hour when the numbers of players grows to 40-50 times the table size. The simulator may use statistical data obtained from operation of Hold'Em ring games in its game model.

Waiting Time: Both average and distribution are controlled. Average number alone can be misleading, as an improperly balanced algorithm can leave some players waiting for 20 or more seconds to be placed.

BB excess/most uneven distribution: BB excess is determined as the difference between the actual number of BB and the statistical average (number of hands divided by table size). The simulator finds the player with the worst (highest) BB excess value and shows the distribution of positions taken for that player. Similarly, the simulator finds the player with the most uneven distribution of positions and also presents this distribution on the chart.

Additional stats: This section displays other parameters that define the quality of player's experience. Having more than one blind in a row is bound to leave a negative impression on a player, even if statistically positions even out in the long run. Similarly, having three blinds in a row (for example BB-SB-BB) is not considered an acceptable user experience. Average deviation is an important measure of the evenness of position distribution that is calculated in addition to the worst case scenarios. It is defined as average among players difference between maximum number of times played in one spot and minimum number of spots. For example, if one player played 100 times on the button and 105 times under the gun, then the deviation for this player is 5. Average deviation is an arithmetic average of deviations of all players Placement sample: This table shows the placement history for one randomly selected player.

The Wait Time factor is optimized by analysis of simulation results. While intuitively it is clear that players who have waited longer should be placed with more urgency, a balance must be found between the intention to place the player into the most suitable position, while at the same time avoiding long wait times.

Figure 10:
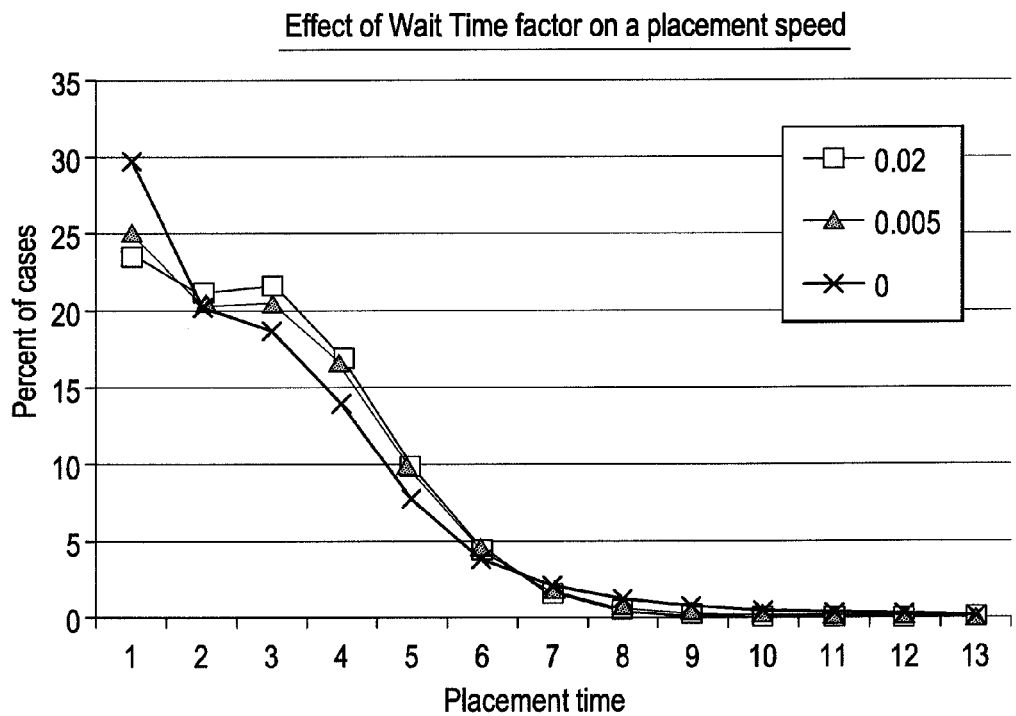
FIG. 10 shows the effect of the Wait Time factor on the placement speed.

FIG. 10 shows the distribution of placement time with different values of the Wait Time factor. This diagram shows that while providing overall reasonable placement, the version of the algorithm that does not take Wait Time into account (Wait Time factor=0.0, line with cross markers on the chart) has a long tail and a significant number of players have to wait very long for placement. More specifically, in 1.3% of cases players have to wait for 9 or more seconds to be placed. As soon as Wait Time factor is set to 0.005 the situation becomes considerably better. Only in 0.23% of cases do players have to wait for 8 seconds, and the number of cases where the wait is 9 seconds or longer has dropped to 0.1%. Further increase of the factor to 0.02 does not provide any noticeable benefit in comparison with the value of 0.005.

Figure 11:
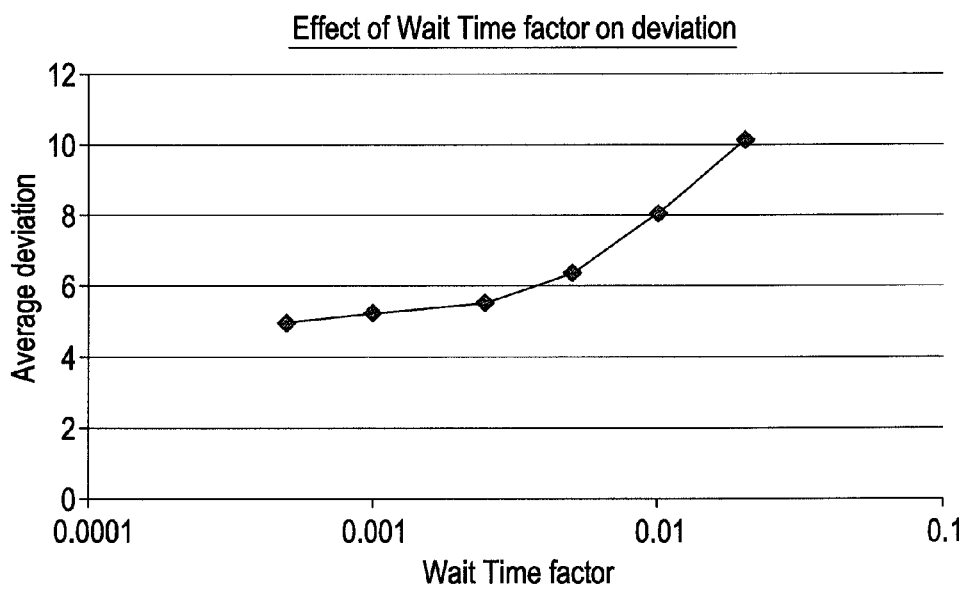
FIG. 11 shows the effect of the Wait Time factor on the evenness of position distribution.

The use of the Wait Time factor negatively affects the evenness of seat distribution (i.e. increases deviation), as the algorithm is forced to make decisions early. The effect on the average deviation is shown FIG. 11. It can be seen that the average deviation starts growing quickly after the Wait Time factor becomes bigger than 0.002. At 0.005 the effect on the average deviation is still fairly small, while the improvement in wait times has already almost fully eliminated the cases with long waits. From this point of view, the value of 0.005 is considered close to optimal.

System Overview

An example system for implementing the placement algorithms described above is illustrated in FIG. 12.

Figure 12:
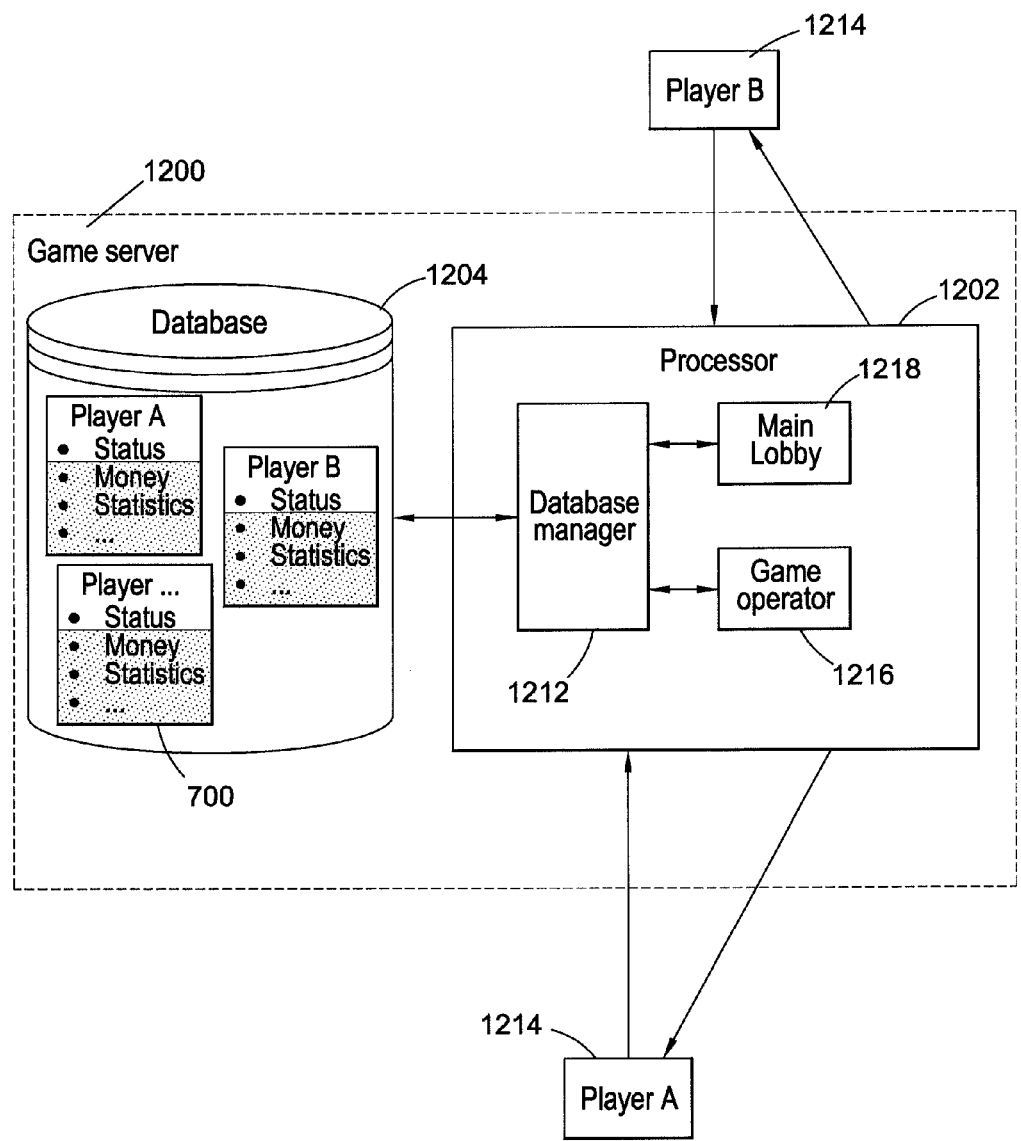
FIG. 12 shows a system for operating games and reducing player idle time.

As shown in FIG. 12, a game server 1200 is provided for operating games. The server 1200 comprises a processor 1202 and game state storage, e.g. a database 1204 (the database may alternatively be external to the server). The database 1204 is adapted to store player related data, including player records 700. The processor is adapted to run software modules, including for example a game operator module 1216 and lobby modules, such as a main lobby module 1218. Players can connect client devices 1214 to the game server 1200, for example via an internet connection. The game operator module 1216 can request, create, modify, or delete data from the database 1204; create, modify, or delete tables, place players, and maintain game play.

Player records 700 are created (if none exist) or retrieved (if already existing) when the players 1214 buy-in to the game. The player record 700 contains information about the associated player, including status, monetary information and various statistical parameters. Changes of player status are reflected in this record. When a player joins a table a number of game-related structures are created to record the player's state in the game. This may be done by the game operator module 1216.

Player records 700 can be committed to the database 1204 via a database manager 1212. This guarantees that overall status of games can be restored in case there is a problem.

A main lobby module 1218 includes associated lobby data structures which can contain information on the location of every player logged into the system. The main lobby data structure for example contains the ID of the game lobby the player is playing at. It may also contain the ID of the table a player is currently playing at. This information could be used, for example, for a Find Player function.

Table data structures may be created (and destroyed when no longer needed) by the game operator module. During operation of games, the operator module 1216 may then associate players with (and disassociate players from) the relevant table data structures when assigning the players to tables.

Lobby data structures and table data structures may also be stored in database 1204 with the player data.

For players to participate in a game, they may be able to download or otherwise store a client software application on a client device 1214. The player may also be able to operate a remote application from the client device to participate in a game (e.g. by way of a web application accessed through a browser). Suitable client devices include personal computers, laptops, smartphones and other mobile telephony devices, tablet computers, games consoles, smart TVs and media players, and the like. The client device 1214 may be connected to the game server 1200, for example via a wired or wireless internet connection, such as a residential DSL or cable internet connection or via a mobile telephone network. The client device 1214 and associated client software application communicate with the game server 1200 and receive communications from the game server 1200 via the network.

The rapid placement game may be particularly beneficial for use where the client device is a mobile telephone or any other device with limited display area. With the rapid placement game the player can immediately progress to a new game and need not remain at a game he has no more interest in until the hand is finished. Conventionally, players have compensated for this necessity to wait by participating in simultaneous games at multiple tables. In this case the client device may be required to display more than one table simultaneously. Especially in a device with relatively small display area, such as a mobile phone, there is little space to display multiple tables at once. Therefore the rapid placement game is advantageous, as the necessity to wait is reduced, and the incentive to participate in simultaneous games is reduced, and the display space is not as crowded.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A computer-implemented method of operating instances of a game having a plurality of game positions that can be occupied by players, the method comprising:
associating with a player a plurality of weights relating to respective game positions, each weight indicative of a respective bias towards placement of the player at the respective game position;
initialising the weights prior to participation of the player in a game,
wherein initialising comprises setting the weight for a selected starting position to a given value indicating a first bias towards placement of the player at the starting position, and setting the weights for other positions to one or more other values indicating a lower bias towards placement at those positions relative to the first bias,
wherein setting the weight for the selected starting position comprising calculating the average weight for that starting position, where $$AvgWeight = \frac{1}{N\left(1 - \left(\left(\frac{N-1}{N}\right)^{TableSize}\right)\right)}$$

where N is a configurable parameter and TableSize is the number of players at a full table;

in response to participation of a player in a first game instance at a given game position, updating each of the plurality of weights to indicate an altered bias towards placement at each respective position; and assigning the player to a second game instance based on one or more of the updated weights.

2. A method according to claim 1, wherein the updating step is performed in dependence on the given game position occupied by the player in the first game instance.

3. A method according to claim 1, wherein the updating step comprises updating the weight for the given game position to indicate a reduced bias towards placement at that position.

4. A method according to claim 1, comprising updating the weights for one or more of the positions other than the given game position to indicate an increased bias towards placement at the one or more positions.

5. A method according to claim 4, wherein updating weights for positions other than the given game position maintains an ordering of those weights relative to each other.

6. A method according to claim 1, wherein the weights are updated so that, after updating, the weight for the given game position indicates a lowest bias towards placement at that position relative to the weights for the other positions.

7. A method according to claim 1, wherein updating a weight comprises multiplying the weight by an update factor.

8. A method according to claim 1, wherein updating a weight corresponding to the given game position comprises one or both of: multiplying the weight by an update factor, and adding a predetermined weight value.

9. A method according to claim 8, wherein the update factor is selected in dependence on a number of game positions in the game.

10. A method according to claim 1, wherein N is equal to three times TableSize.

11. A method according to claim 1, wherein setting the weight for subsequent game positions, following play order comprises setting the weight as follows:

$SW_{j+1}=(N-1)SW_j/N.$

12. A method according to claim 1, wherein initialising comprises setting the weights to respective values indicating a bias ordering of the game positions matching a predetermined game position order.

13. A method according to claim 1, wherein the assigning step comprises:
for a given game position in the second game instance, selecting the player from a plurality of players based on comparing the player weight for the given game position to weights for the given position associated with one or more other players.

14. A method according to claim 1, wherein the assigning step comprises assigning the player further based on a time value associated with the player.

15. A method according to claim 1, wherein the assigning step comprises: for a given game position in the second game instance, computing a bias measure indicating a bias towards placement of the player at the given game position in dependence on the player weight for the given game position and a time value associated with the player.

16. A method according to claim 15, wherein the bias measure is computed such that an increase in the time value results in an increased bias towards placement of the player.

17. A method according to 14, wherein the time value indicates a player idle time or wait time, preferably a time since the player ceased participating in the first game instance.

18. A method according to claim 1, comprising, for a given game position in the second game instance, computing a bias measure relating to the game position for each of a plurality of players; selecting the player having a bias value indicating the greatest bias towards placement at the given game position; and assigning the selected player to the second game instance at the given game position.

19. A method according to claim 1, comprising assigning the player to the second game instance in response to a player action in the first game instance.

20. A method according to claim 19, wherein the player action comprises withdrawal from the game or a game round.

21. A method according to claim 1, comprising connecting the player to the second game instance while maintaining the player's connection to the first game instance.

22. A method according to claim 1, wherein the assigning step is performed in accordance with a placement algorithm.

23. A method according to claim 19, wherein the placement algorithm is selected, or one or more parameters of the placement algorithm are varied, in dependence on a number of participating players.

24. A method according to claim 19, wherein the placement algorithm is initiated in response to a triggering condition, the triggering condition preferably comprising one or both of: expiry of a time limit; and a number of idle players exceeding a threshold.

25. A computer-implemented method of operating instances of a game having a plurality of game positions that can be occupied by players, the method comprising: initiating a game instance and initializing weights for each player relating to respective starting game positions, wherein setting the weight for the selected starting position comprising calculating the average weight for that starting position, where $$AvgWeight = \frac{1}{N\left(1-\left(\left(\frac{N-1}{N}\right)^{TableSize}\right)\right)}$$

where N is a configurable parameter and TableSize is the number of players at a full table; for each game position in the game instance, assigning a player to the game position, wherein the assigning comprises, for a given game position:
for each of a plurality of players available for assignment to the given game position, calculating a bias measure indicating a bias towards placement of the player in the respective position, wherein the bias measure is calculated in dependence on (i) position weighting information associated with the player, and (ii) wait time information indicating a time the player has been waiting to be assigned to a game;
selecting one of the plurality of available players in dependence on the calculated bias measures; and
assigning the selected player to the given game position.

26. A method according to claim 25, wherein the selecting step comprises selecting the player having a bias measure indicating the greatest bias towards placement at the given game position.

27. A method according to claim 25, wherein the selecting step comprises5 selecting the player having the lowest or highest bias measure.

28. A computer-implemented method of operating instances of a game having a plurality of game positions that can be occupied by players, the method comprising:

for each of a plurality of players, associating with the player:
   a plurality of weights relating to a plurality of respective game positions, each weight indicative of a respective bias towards placement of the player at the respective game position; and
   an idle indicator for indicating whether the player is currently participating in a game or is idle;
initiating an instance of the game;
initialising the weights,
   wherein initialising comprises setting the weight for a selected starting position to a given value indicating a first bias towards placement of the player at the starting position, and setting the weights for other positions to one or more other values indicating a lower bias towards placement at those positions relative to the first bias,
   wherein setting the weight for the selected starting position comprising calculating the average weight for that starting position, where $$AvgWeight = \frac{1}{N\left(1 - \left(\left(\frac{N-1}{N}\right)^{TableSize}\right)\right)}$$

where N is a configurable parameter and TableSize is the number of players at a full table; for each game position associated with the game instance, selecting one of the plurality of players in dependence on the players' idle indicators and weights for the game position, and assigning the selected player to the game position; and updating each of the plurality of weights associated with an assigned player to indicate an altered bias towards placement of the assigned player at each respective position.

29. A method according to claim 28, comprising:
   in response to cessation of a given player's participation in the game instance, setting the idle indicator for the player to indicate that the player is idle.

30. A method according to claim 28, wherein the selecting step selects only idle players according to their idle indicators.

31. A method according to claim 26, further comprising associating an idle time with players indicated as being idle by the idle indicator, and wherein the selecting step selects a player for a game position further in dependence on the players' idle times.

* * * * *

UNITED STATES PATENT AND TRADEMARK OFFICE
CERTIFICATE OF CORRECTION

| | | |
|---|---|---|
| PATENT NO. | : 9,251,650 B2 | Page 1 of 1 |
| APPLICATION NO. | : 14/378055 | |
| DATED | : February 2, 2016 | |
| INVENTOR(S) | : Serguei Bourenkov et al. | |

It is certified that error appears in the above-identified patent and that said Letters Patent is hereby corrected as shown below:

In the claims,

Claim 27, at column 24, line 63, change "comprises5" to -- comprises --

Signed and Sealed this
Twenty-third Day of August, 2016

Michelle K. Lee
*Director of the United States Patent and Trademark Office*